United States Patent
Thomas et al.

(10) Patent No.: US 10,524,138 B2
(45) Date of Patent: *Dec. 31, 2019

(54) SYSTEM FOR RF QUIET CHANNEL OPTIMIZATION

(71) Applicant: Honeywell International Inc., Morris Plains, NJ (US)

(72) Inventors: Robert J. Thomas, Brier, WA (US); Jeffrey M. Reeder, Redmond, WA (US)

(73) Assignee: Honeywell International Inc., Morris Plains, NJ (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/671,940

(22) Filed: Aug. 8, 2017

(65) Prior Publication Data

US 2017/0339583 A1  Nov. 23, 2017

Related U.S. Application Data

(63) Continuation of application No. 14/178,910, filed on Feb. 12, 2014, now Pat. No. 9,763,112.

(51) Int. Cl.
*H04W 24/02* (2009.01)
*H04W 72/08* (2009.01)

(52) U.S. Cl.
CPC ......... *H04W 24/02* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 5,991,901 A | * | 11/1999 | Mulford ............... H04L 1/20 455/421 |
| 6,298,081 B1 | | 10/2001 | Almgren et al. |
| 9,191,968 B2 | | 11/2015 | Wang et al. |
| 9,326,271 B2 | | 4/2016 | Zhao et al. |
| 9,408,095 B2 | | 8/2016 | Lightstone et al. |
| 9,763,112 B2 | * | 9/2017 | Thomas ............. H04W 72/085 |

(Continued)

OTHER PUBLICATIONS http://www.techstreet.com/products/1158465, "IEEE Standard for Telecommunications and Information Exchange," 6 pages, printed Sep. 14, 2014.

(Continued)

*Primary Examiner* — Xavier Szewai Wong
(74) *Attorney, Agent, or Firm* — Seager, Tufte & Wickhem LLP (57) ABSTRACT

A communications system having a network of nodes that may transmit and receive wireless signals. RF channel quietness may be measured at each node. A channel that is the best for all of the nodes may be selected. However, if all of the nodes except for one node determine that a particular channel is the best and not acceptable to the one node but that another channel is acceptable to all of the nodes, then the entire network may choose to operate on the other channel. The network may choose to operate on more than one channel in a time slotted fashion if a single acceptable channel cannot be found for all of the nodes. Channel quietness measurements may be facilitated by and uploaded to a host controller. The host controller may build a profile of measurements from the nodes for each channel.

19 Claims, 7 Drawing Sheets

(56) References Cited

U.S. PATENT DOCUMENTS

| | | | |
|---|---|---|---|
| 2005/0036474 A1* | 2/2005 | Zhang | H04B 7/2618 370/347 |
| 2006/0072502 A1* | 4/2006 | Crandall | H04W 72/02 370/329 |
| 2006/0239333 A1* | 10/2006 | Albert | H04W 72/0406 375/130 |
| 2007/0091813 A1 | 4/2007 | Richard et al. | |
| 2009/0135778 A1 | 5/2009 | Lee et al. | |
| 2011/0116393 A1 | 5/2011 | Hong et al. | |
| 2012/0134280 A1* | 5/2012 | Rotvold | H04B 17/24 370/252 |
| 2012/0257585 A1* | 10/2012 | Sydor | H04W 72/082 370/329 |
| 2014/0313909 A1* | 10/2014 | Doherty | H04W 24/02 370/252 |
| 2015/0245364 A1 | 8/2015 | Yacovitch et al. | |

OTHER PUBLICATIONS

Slimane et al., "A Prioritized Multi-Channel Multi-Time Slot MAC Protocol for Large-Scale Wireless Sensor Networks," 8 pages, 2009.

* cited by examiner

SYSTEM FOR RF QUIET CHANNEL OPTIMIZATION

This application is a continuation of U.S. patent application Ser. No. 14/178,910, filed Feb. 12, 2014. U.S. patent application Ser. No. 14/178,910, filed Feb. 12, 2014, is hereby incorporated by reference.

BACKGROUND

The present disclosure pertains to communication systems and particularly to wireless communication systems.

SUMMARY

The disclosure reveals a communications system having a network of nodes that may transmit and receive wireless signals. RF channel quietness may be measured at each node. A channel that is the best for all of the nodes may be selected. However, if all of the nodes except for one node determine that a particular channel is the best and not acceptable to the one node but that another channel is acceptable to all of the nodes, then the entire network may choose to operate on the other channel. The network may choose to operate on more than one channel in a time slotted fashion if a single acceptable channel cannot be found for all of the nodes. Channel quietness measurements may be facilitated by and uploaded to a host controller. The host controller may build a profile of measurements from the nodes for each channel.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the present system and approach.

In the description, a host controller may identify more than one quiet channel (instead of only one quietest channel) from the profile of a channel's RF (e.g., radio frequency or other electromagnetic interference) energy level that is appropriate for different portions of the network.

The present system and approach may be used in a building automation and control system.

In a multichannel wireless system a host controller, coordinator or concentrator measures the RF energy on each of those channels to determine which has the lowest value and then uses that channel for communications. As systems become more and more expansive the proper channel selection at the host controller may not be suitable, for example, 100 meters away at one of the controllers. This may lead to areas of poor communications, intermittent communications, or even a total loss of communications.

A protocol implementation may have virtually all wireless nodes doing a periodic measurement of RF noise at their respective locations and then uploading the measurement to the host controller. The host controller may build a profile of the overall quietest channel and in the simplest implementation choose that channel for implementation. To improve that approach, the host controller may determine more than one channel that is appropriate for different portions of the network and time divide the protocol so that channel 'C' devices communicate during the first half of a time slot and channel 'D' devices communicate during the second half of the time slot. This may be further improved by allowing critical devices to participate in a plurality of channels so that there is no delay in getting the message through. A light switch or dimmer might be such a use. One may want the lights to go on or off quickly when hitting the switch.

An implementation may occur in that one can collect the quiet channel data, select a plurality of channels based on that data, communicate to the devices that occupy the different portions of the time slots during their next communication, and continue to update over time.

One key to the present system and approach is that the RF channel quietness may be measured by every node in the network and the channel that is picked is the best one for the entire network, not just one node in particular. For example, if all nodes except for one determine that channel A is the best but channel B is acceptable, and the other node determines that channel A is unacceptable but channel B is acceptable, then the network may choose to operate on channel B.

The present approach does not necessarily describe a process where a single node measures and determines the best channel directly and all by itself. The present approach may use the measurements from other nodes to determine the best channel for all of the nodes.

The nodes can take measurements and the best channel for all nodes may be chosen. The network may choose to operate on more than one channel in a time-slotted fashion if a single acceptable channel cannot be found for all nodes.

Figure 1:
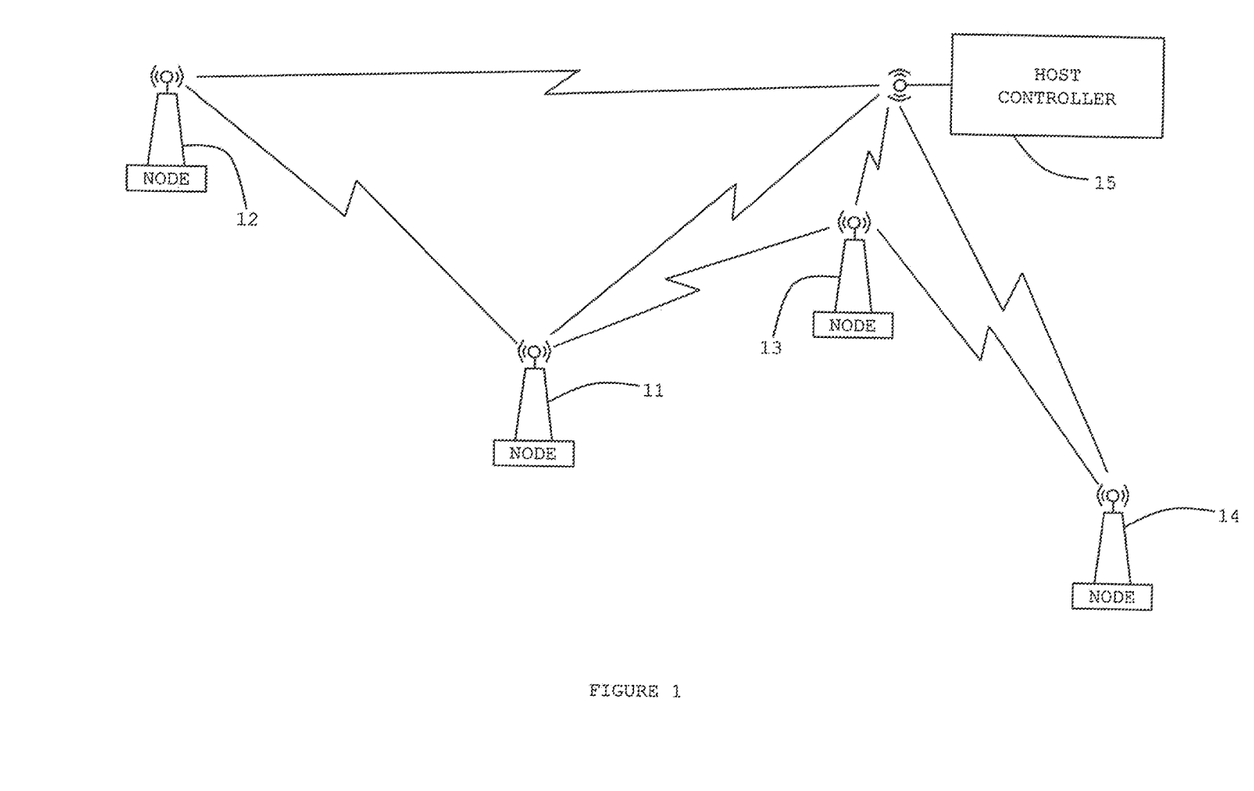
FIG. 1 is a diagram of a wireless communication system showing a network of some nodes.
Figure 2:
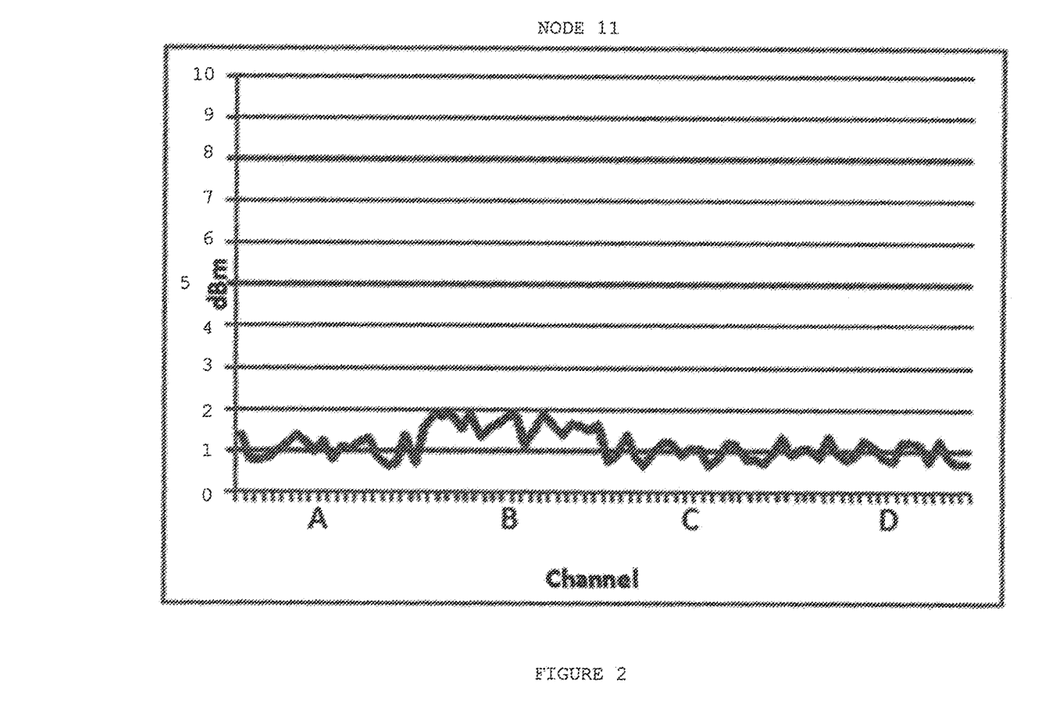
FIGS. 2-5 are diagrams of example measurements at nodes of RF background noise versus channel for each of the nodes, respectively.
Figure 3:
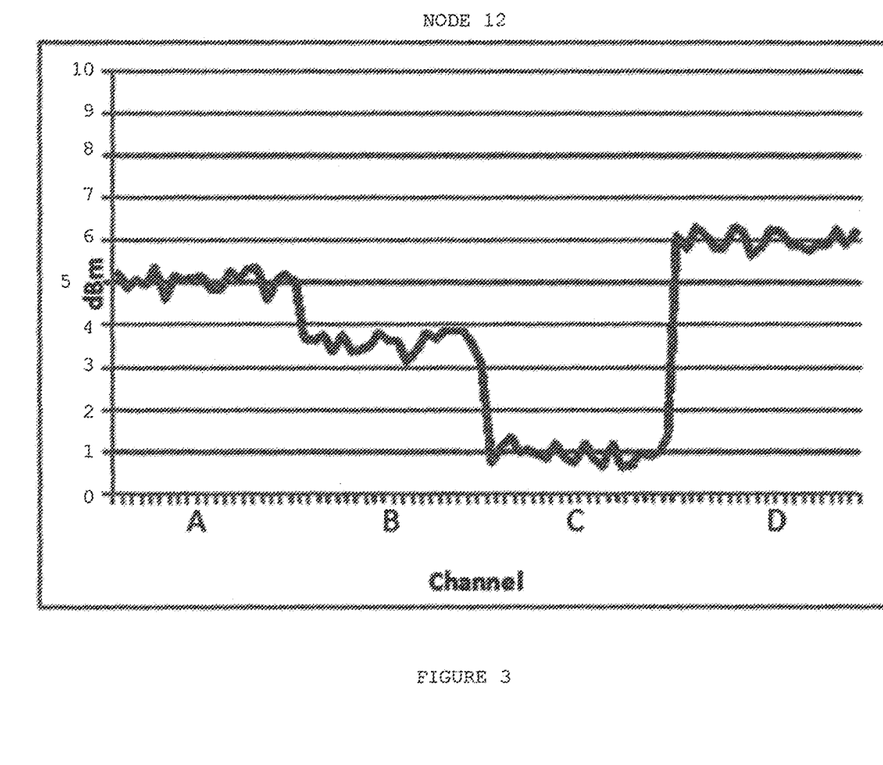
Figure 4:
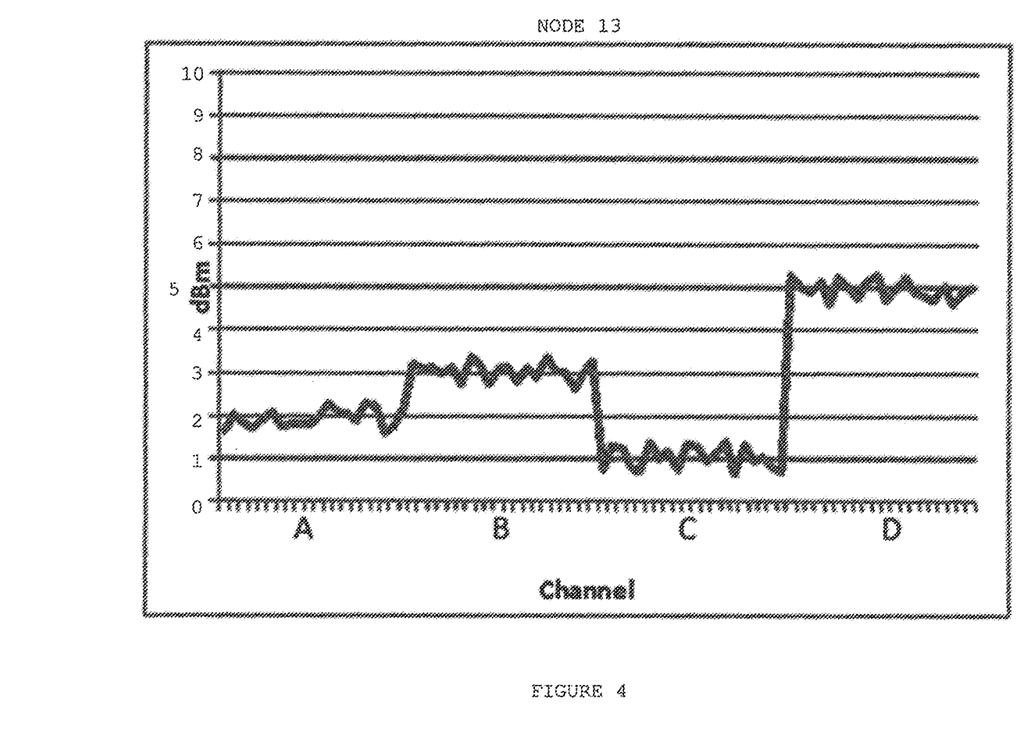
Figure 5:
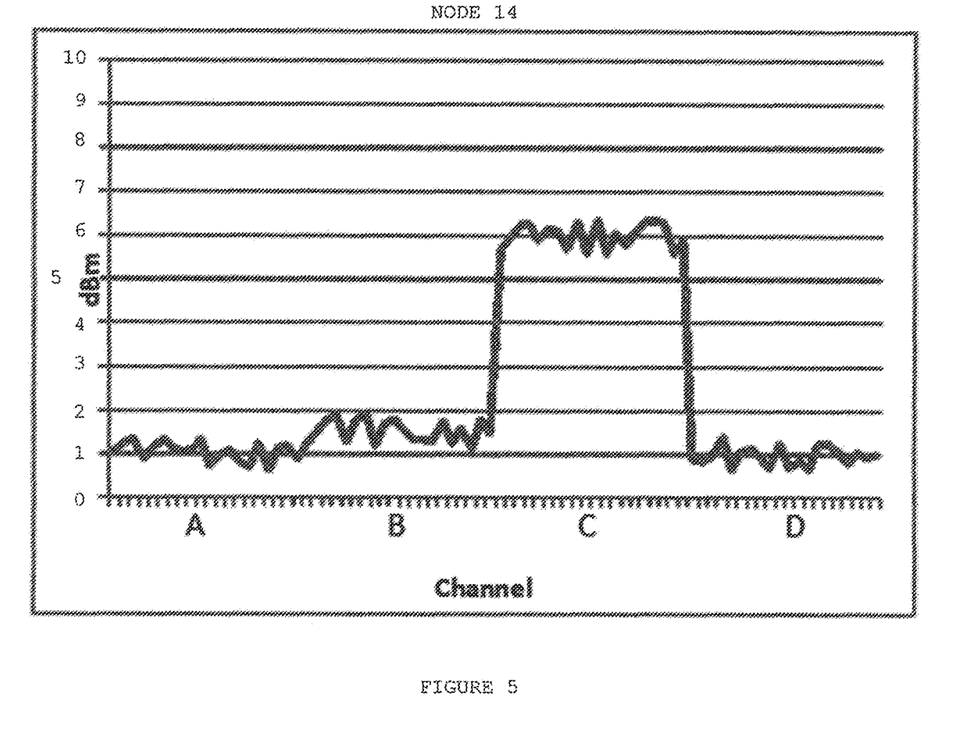

FIG. 1 is a diagram of a wireless communication system showing a network of some nodes. The nodes may take measurements and the best channel or channels for each of the nodes can be determined. The system may address where the network may choose to operate on more than one channel in a time-slotted fashion if a single channel cannot be found on all of the nodes of the network. The communication system may be used in a building automation and communication system.

Measurements may be made of RF channel quietness for each node in the entire network, not just one node in particular. The example measurements of nodes 11, 12, 13 and 14 of FIG. 1 may be illustrated in dBm (amplitude) of RF background noise versus channel (spectrum) in FIGS. 2-5, respectively. ($dBm = log_{10}*$(signal power)/0.001 watt.)

For illustrative purposes, it may be pre-determined that a channel have less than 4 dBm of RF background noise to be an acceptable channel. The readings of the background noise may be scaled with attenuation or amplification, or other, for fitting and recording on a particular graph. As to node 11, the graph of FIG. 2 reveals channels A, B, C and D to be acceptable. A graph of measurements in FIG. 3 reveals channels B and C to be acceptable for node 12. A graph of measurements in FIG. 4 reveals channels A, B and C to be acceptable for node 13. A graph of measurements in FIG. 5 reveals channels A, B and D to be acceptable for node 14. Channel B appears to be acceptable for all of the noted nodes in terms of RF background measurements.

Channels A, C and D appear to be the best for node 11 as the measurements appear to be approximately the same for the three channels. Channel C appears to be the best for node 12. Channel C appears to be the best for node 13. Channels A and D appear to be the best for node 14 as the measurements appear to be approximately the same for the two channels. Thus, channel C may be determined to be the best for all of the nodes except node 14 where channel C is determined to be unacceptable. Channel B may be determined to be acceptable for nodes 11, 12 and 13. Since channel B may also be acceptable for node 14, then the network can choose to operate on channel B. However, if channel C were measured to be the best for node 14, then the network may choose to operate on channel C instead of channel B.

If a single acceptable channel cannot be found for all of the nodes 11-14, then the network may choose to operate on more than one channel in a time-slotted fashion if a channel cannot be found acceptable for all nodes 11-14.

Each of the measurements may be uploaded to a host controller 15. Host controller 15 may build a profile of the measurements at each of the nodes 11-14 for each channel. Host controller 15 may determine an index of quietness from the profile of the measurements. The index of quietness may be derived from the measurements of RF plotted in the graphs of FIGS. 2-5 for possible determination of acceptability or unacceptability for the nodes relative to each of the channels. A value for an acceptable index of quietness may be predetermined. The index of quietness may also be used for determination of a best channel for each of nodes 11-14, respectively.

If a single acceptable channel cannot be found for all of the nodes 11-14, then the network may operate on more than one channel in a time-slotted arrangement.

Even though four channels appear to be noted in the example discussion, the present approach and system may have more or less channels.

Figure 6:
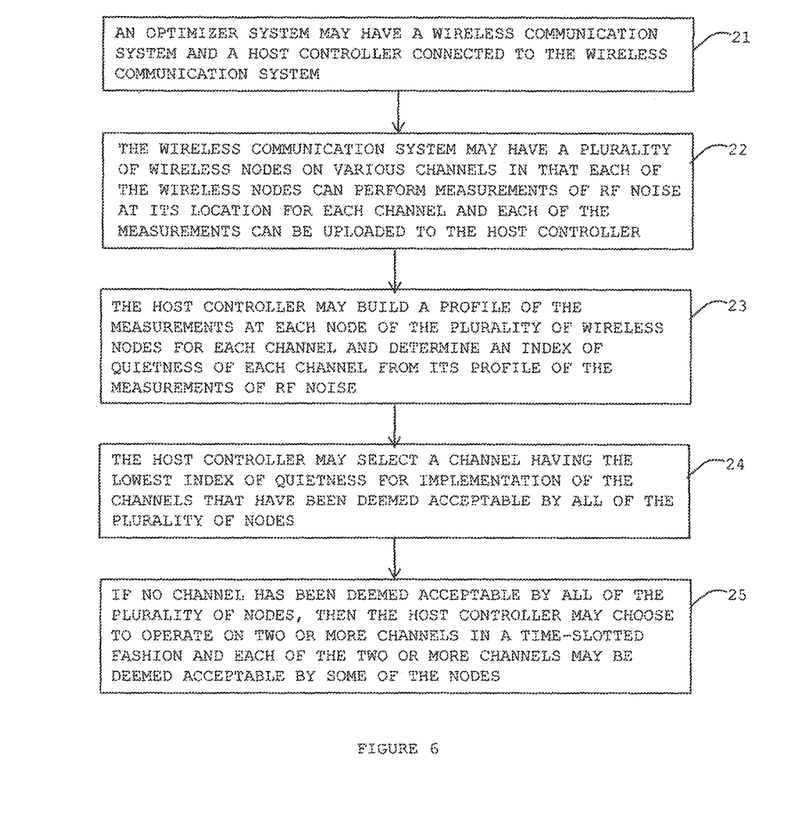
FIG. 6 is a diagram of a flow of the present approach and system.

FIG. 6 is a diagram of a flow of the present approach and system. In symbol 21, an optimizer system may have a wireless communication system and a host controller connected to the wireless communication system. In symbol 22, the wireless communication system may have a plurality of wireless nodes on various channels in that each of the wireless nodes can perform measurements of RF noise at its location for each channel and each of the measurements can be uploaded to the host controller. In symbol 23, the host controller may build a profile of the measurements at each node of the plurality of wireless nodes for each channel and determine an index of quietness of each channel from its profile of the measurements of RF noise. In symbol 24, the host controller may select a channel having the lowest index of quietness for implementation of the channels that have been deemed acceptable by all of the plurality of nodes. In symbol 25, if no channel has been deemed acceptable by all of the plurality of nodes, then the host controller may choose to operate on two or more channels in a time-slotted fashion and each of the two or more channels may be deemed acceptable by some of the nodes.

Figure 7:
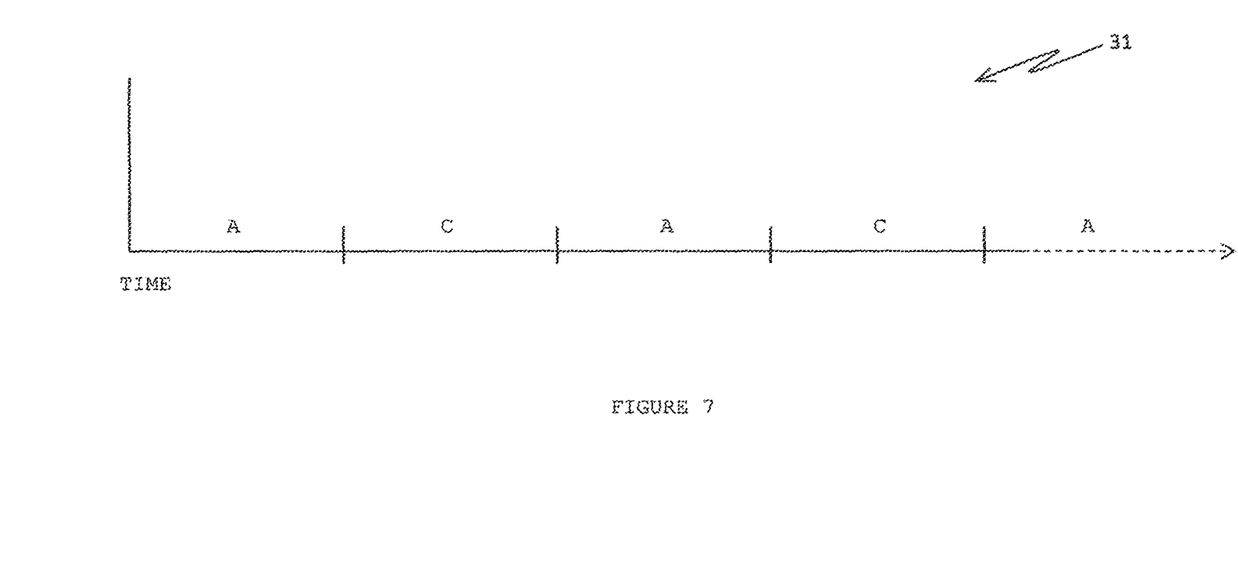
FIG. 7 is a diagram of channels operating in a time slotted fashion.

FIG. 7 is a diagram of a time line graph 31. If no channel has been deemed acceptable by all of the nodes, then the host controller may choose to operate on two or more channels that are acceptable by some of the nodes, but not necessarily the same nodes, in a time-slotted fashion. Graph 31 illustrates, for example, such channels A and C that may operate in the time-slotted fashion. The time slots may not necessarily the same duration for channels A and C. Also, the time slots may not necessarily the same duration for the same channel. Further, if there are more than two channels that are time-slotted, the sequence of the channels may not necessarily stay the same for a duration of operation along a time line.

To recap, a channel optimizer may incorporate a wireless communication system for a building automation and control system, and a host controller connected to the wireless communication system. The wireless communication system may incorporate a plurality of wireless nodes on various channels. Each of the wireless nodes may perform measurements of RF noise at its location for each channel. Each of the measurements may be uploaded to the host controller. The host controller may build a profile of the measurements at each node of the plurality of wireless nodes for each channel.

The host controller may determine an index of quietness of each channel from its profile of the measurements of RF noise.

The host controller may select a channel having the lowest index of quietness for implementation of the channels that have been deemed acceptable by the plurality of nodes.

If no channel has been deemed acceptable by the plurality of nodes, then the host controller may choose to operate on two or more channels in a time-slotted fashion. Each of the two or more channels may be deemed acceptable by some of the nodes.

The host controller may select one or more channels having an index of quietness equal to or less than a predetermined value. The predetermined value may indicate that the channel is sufficient for communication.

If two or more channels have an index of quietness equal to or less than the predetermined value, then the two or more channels may be assigned various portions of a time slot. The time slot may be divided into a number of time sub-slots representing the various portions of the time slot. Two or more devices may participate in the number of channels to reduce a delay of transmitting a message.

If two or more channels have an index of quietness equal to or less than the predetermined value, then the two or more channels may be assigned to two or more devices that occupy different portions of time slots assigned to the two or more channels.

Each of the wireless nodes may perform periodic measurements of RF noise at its location for each channel. The index of quietness for each channel may be updated over time.

An approach for optimizing channel communications may incorporate providing a wireless communication system and connecting a host controller to the wireless communication system. The wireless communication system may incorporate a plurality of wireless nodes on various channels. Each of the wireless nodes may perform measurements of RF noise at its location for each channel. Each of the measurements may be uploaded to the host controller. The host controller may build a profile of the measurements at each node of the plurality of wireless nodes for each channel. The host controller may determine an index of quietness of each channel from its profile of the measurements of RF noise.

The host controller may select a channel having the lowest index of quietness for implementation of the channels that have been deemed acceptable by all of the plurality of nodes.

If no channel has been deemed acceptable by all of the plurality of nodes, then the host controller may choose to operate on two or more channels in a time-slotted fashion.

The host controller may select one or more channels having an index of quietness equal to or less than a predetermined value. The predetermined value may indicate that the channel is sufficient for communication.

The approach may further incorporate assigning the two or more channels various portions of a time slot if two or more channels have an index of quietness equal to or less than the predetermined value, and dividing the time slot into a number of time sub-slots representing the various portions of the time slot.

Two or more devices may participate in the number of channels to reduce a delay of transmitting a message.

If two or more channels have an index of quietness equal to or less than the predetermined value, then the two or more channels may be assigned to two or more devices that occupy different portions of time slots assigned to the two or more channels.

An optimizer system may incorporate a wireless communication system, and a host controller connected to the wireless communication system. The wireless communication system may incorporate a plurality of wireless nodes on various channels. Each of the wireless nodes may perform measurements of RF noise at its location for each channel.

Each of the measurements may be uploaded to the host controller. The host controller may build a profile of the measurements at each node of the plurality of wireless nodes for each channel. The host controller may determine an index of quietness of each channel from its profile of the measurements of RF noise.

The host controller may select a channel having the lowest index of quietness for implementation of the channels that have been deemed acceptable by all of the plurality of nodes.

If no channel has been deemed acceptable by all of the plurality of nodes, then the host controller may choose to operate on two or more channels in a time-slotted fashion. Each of the two or more channels may be deemed acceptable by some of the nodes.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A channel optimizer system comprising:
a host controller configured to be connected to a wireless communication system having nodes that communicate on one or more channels of a plurality of channels; and wherein:
the host controller is configured to receive measurements of radio frequency (RF) noise for two or more of the plurality of channels taken by the nodes;
the host controller selects a channel on which all of the nodes are to communicate and the selected channel is a channel that is deemed acceptable for each of the nodes based on the measurements of RF noise taken by the nodes; and
if no channel has been deemed acceptable by each of the nodes, then the host controller chooses to operate each of the nodes on two or more channels in a time-slotted fashion.

2. The optimizer system of claim 1, wherein the host controller selects the channel on which all of the nodes are to communicate based on which channel of channels deemed acceptable by each of the nodes has a lowest index of quietness.

3. The optimizer system of claim 1, wherein the host controller builds a profile of the measurements taken by the nodes for each channel of the plurality of channels and determines an index of quietness of each channel from its profile of the measurements of RF noise.

4. The optimizer system of claim 1, wherein:
the host controller selects one or more channels having an index of quietness equal to or less than a predetermined value; and
the predetermined value indicates that the channel is deemed acceptable for communication.

5. The optimizer system of claim 4, wherein:
if two or more channels have an index of quietness equal to or less than the predetermined value, then the host controller assigns each of two or more channels a portion of a time slot; and
the host controller divides the time slot into a number of time sub-slots representing the portion of the time slot.

6. The optimizer system of claim 5, wherein two or more devices participate in the two or more channels to reduce a delay of transmitting a message.

7. The optimizer system of claim 4, wherein if two or more channels have an index of quietness equal to or less than the predetermined value, then the host controller assigns the two or more channels to two or more devices that occupy different portions of time slots assigned to the two or more channels.

8. The optimizer system of claim 4, wherein:
the host controller is configured to receive periodic measurements of RF noise taken by the nodes for the two or more channels of the plurality of channels; and
the host controller updates the index of quietness for each channel over time.

9. The optimizer system of claim 1, further comprising:
a wireless communication system comprising the nodes and in communication with the host controller; and
the nodes of the wireless communication system are wireless nodes configured to communicate on the plurality of channels.

10. A method for optimizing channel communications with a host controller, the method comprising:
receiving at a host controller measurements of radio frequency (RF) noise for two or more of a plurality of channels taken by nodes of a communication system;
selecting with the host controller a channel on which all of the nodes are to communicate, wherein the selected channel is a channel that is deemed acceptable for each of the nodes based on the measurements of RF noise taken by the nodes;
choosing with the host controller to operate each of the wireless nodes on two or more channels in a time-slotted fashion when no channel is deemed acceptable for each of the nodes.

11. The method of claim 10, further comprising determining with the host controller an index of quietness of two or more channels from each channel's measurements of RF noise taken by the nodes.

12. The method of claim 11, wherein the selected channel on which all of the nodes are to communicate has a lowest index of quietness of one or more channels that have been deemed acceptable by each of the nodes.

13. The method of claim 11, wherein:
the host controller selects one or more channels having an index of quietness equal to or less than a predetermined value; and
the predetermined value indicates that the channel is sufficient for communication.

14. The method of claim 11, further comprising:
assigning with the host controller the two or more channels various portions of a time slot if two or more channels have an index of quietness equal to or less than a predetermined value; and
dividing the time slot into a number of time sub-slots representing the portions of the time slot.

15. The method of claim 14, wherein two or more devices participate in the two or more channels to reduce a delay of transmitting a message.

16. The method of claim 11, wherein if two or more channels have an index of quietness equal to or less than a predetermined value, then the two or more channels are assigned to two or more devices that occupy different portions of time slots assigned to the two or more channels.

17. A wireless communication system comprising:
a plurality of wireless nodes;
a plurality of channels; and
wherein:
each of the wireless nodes has a location and each of the wireless nodes operates on one or more channels of the plurality of channels;
each of the wireless nodes performs a measurement of radio frequency (RF) noise at its location for each channel of the plurality of channels;
each of the wireless nodes outputs the measurements for each of the plurality of channels at each of the wireless nodes; and
each of the wireless nodes receives an input indicating on which channel of the plurality of channels to communicate with other wireless nodes of the plurality of wireless nodes, the channel is selected based on the measurements of RF noise by each of the wireless nodes and the channel is a channel that is deemed acceptable for each of the nodes based on the measurements of RF noise taken by the nodes.

18. The wireless communication system of claim 17, wherein each of the wireless nodes performs periodic measurements of RF noise at its location for each channel of the plurality of channels.

19. The wireless communication system of claim 17, wherein two or more of the wireless nodes are configured to communicate on two or more channels in a time-slotted fashion when each of the wireless nodes do not have a common acceptable channel on which to communicate.

* * * * *